(12) United States Patent
Sander

(10) Patent No.: US 7,206,127 B2
(45) Date of Patent: Apr. 17, 2007

(54) STEREOMICROSCOPE

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 2 days.

(21) Appl. No.: 10/718,452

(22) Filed: Nov. 20, 2003

(65) Prior Publication Data

US 2004/0120032 A1 Jun. 24, 2004

(30) Foreign Application Priority Data

Nov. 29, 2002 (DE) ................. 102 55 960

(51) Int. Cl.
*G02B 21/22* (2006.01)

(52) U.S. Cl. ..................................... 359/376

(58) Field of Classification Search ............... 359/368, 359/372–377, 379, 380, 384, 431
See application file for complete search history.

(56) References Cited

U.S. PATENT DOCUMENTS

| | | | |
|---|---|---|---|
| 4,448,498 A * | 5/1984 | Muller et al. ................. 359/377 |
| 4,605,287 A | 8/1986 | Lang et al. |
| 4,763,968 A * | 8/1988 | Minami et al. .............. 359/377 |
| 4,991,947 A | 2/1991 | Sander et al. |
| 5,052,789 A * | 10/1991 | Kleinberg ................... 359/375 |
| 5,822,114 A | 10/1998 | Hanzawa |
| 5,861,982 A * | 1/1999 | Takahama et al. .......... 359/381 |
| 5,898,518 A | 4/1999 | Biber |
| 6,081,371 A * | 6/2000 | Shioda et al. ............... 359/372 |
| 6,304,374 B1 * | 10/2001 | Hanzawa ..................... 359/380 |
| 6,356,088 B1 * | 3/2002 | Simon et al. ............... 324/752 |
| 2001/0010592 A1 | 8/2001 | Nakamura |
| 2003/0165012 A1 * | 9/2003 | Straehle et al. ............. 359/431 |

FOREIGN PATENT DOCUMENTS

| | | |
|---|---|---|
| DE | 43 31 635 A1 | 6/1994 |
| DE | 195 41 237 A1 | 5/1996 |
| DE | 100 50 351 A1 | 5/2001 |

OTHER PUBLICATIONS

Anonymous: Leica M841 EBS, Internet Article, Online!—1995.
Anonymous: Leica M841, Internet Article, Online!—1995.

* cited by examiner

*Primary Examiner*—Alessandro Amari
(74) *Attorney, Agent, or Firm*—Hodgson Russ LLP

(57) ABSTRACT

Stereomicroscope having an objective (2) and a zoom system (7) downstream of the objective, while between the objective (2) and the zoom system (7) is provided a deflector element (5) for deflecting observation beams emerging from the objective (2) into corresponding magnification or observation channels of the zoom system (7), characterised in that the zoom system (7) comprises at least three substantially horizontally extending magnification or observation channels (7a, 7b, 7c, 7d).

13 Claims, 3 Drawing Sheets

STEREOMICROSCOPE

CROSS-REFERENCE TO RELATED APPLICATIONS

The present application claims priority of German patent application no. 102 55 960.0 filed Nov. 29, 2003, which is incorporated herein by reference.

BACKGROUND OF THE INVENTION

The present invention relates to a stereomicroscope of the general type having an objective, a zoom system downstream of the objective, and a deflector element provided between the objective and the zoom system for deflecting observation beams emerging from the objective into corresponding magnification or observation channels of the zoom system.

Operating microscopes used in ophthalmology make it possible for both a main operator and an assistant to view the same operating area.

An ophthalmological operating microscope of this kind is known for example from DE 43 31 635 C2. The operating microscope described therein has binocular tubes for the main observer and a second observer as well as a beam splitter 4 which divides the object light between the main observer and second observer. A disadvantage of this microscope is that it is relatively tall in construction as the complete magnification optical means for the main observer are arranged substantially vertically.

A stereomicroscope for simultaneous observation by a first and second observer is known from DE 33 33 471 C2. The optical paths are divided for the first and second observers by a dividing plate, as a result of which some loss of light intensity has to be tolerated.

Finally, a similar microscope is known from U.S. Pat. No. 5,898,518.

Operating microscopes of this kind have to satisfy a number of basic requirements in practice.

One requirement is that the overall height of the microscope must be kept to a minimum for ergonomic reasons. In addition, the assistant's viewer must be able to be pivoted from the right to the left hand side of the microscope (or vice versa) quickly and with no adaptation required, and neither the image quality nor the overall height should be negatively affected by any accessories which are required only for certain operating techniques. Also, both the main observer and the assistant should have the opportunity to observe the so-called red reflex to the same degree. In addition, the free working interval, i.e. the area between the object and the objective, should not be reduced by components.

In conventional microscopes these requirements are only partly met.

The operating microscope M841 of the present Applicant, for example, ensures that the assistant and main operator actually have the same field of vision.

This is achieved by mounting the assistant's viewing device above the magnification system and using, as the magnification system, a zoom system which is made up of four identical monoscopic magnification systems. Two of the four parallel systems make up the stereoscopic magnification system for the main observer. Further systems or channels located perpendicularly on the connecting axis of these systems provide the stereoscopic magnification system for the assistant.

U.S. 2001/0,010,592A1 discloses a microscope which can be used in neurosurgery, which comprises an objective system, a zoom system and an eyepiece system. The objective system is mounted substantially vertically, while the zoom system consisting of two individual systems or optical channels is mounted horizontally. The essential novelty of the microscope described therein is that the axis of the zoom system is located perpendicularly to the axis of the main objective. As mentioned, the zoom system in turn consists of two identical magnification channels the axes of which extend parallel to each other, thereby ensuring stereoscopic viewing of an object. One disadvantage of the microscope described therein is that as a result of the use of a semi-transparent beam splitter for spatially separating an assistant's optical path from the main operator's optical path, relatively great loss of light is unavoidable. Also, the free working interval is substantially reduced by the assistant's microscope. A highly complex optical set-up is required as the main operator and assistant require two separate main objectives.

The aim of the present invention is to provide a stereomicroscope with the best possible light economy while at the same time being easy to handle, low in height, with an unrestricted free working interval and a common main objective.

BRIEF SUMMARY OF THE INVENTION

This aim is achieved with a stereomicroscope characterised in that the zoom system comprises at least three substantially horizontally extending magnification or observation channels.

Thanks to the measure according to the invention of providing at least three horizontally extending magnification channels in a zoom system, it is first of all possible to provide an ophthalmological operating microscope which gives the option of stereoscopic viewing by a main operator and only monoscopic viewing by an assistant. Because the zoom system has three magnification or observation channels, spatial separation of the main operator's optical path and the assistant's optical path can be achieved in order to define the respective observation axes in a simple manner without the need to use semi-transparent beam splitters. As a result of the horizontally extending magnification or observation channels, at the same time the overall height of the microscope can be kept very small, which is extremely favorable for ergonomic reasons, as already mentioned. It is also possible to use the third magnification channel in order to attach a documentation device, such as a camera.

Advantageous embodiments of the stereomicroscope according to the invention are the subject of the subsidiary claims.

Advantageously, the zoom system comprises four observation or magnification channels. In this embodiment, both the main observer and the assistant can view the object stereoscopically. The provision of four magnification channels in the zoom system constitutes the preferred embodiment of the stereomicroscope according to the invention, as a small vertical spacing between the observation axis in question and the object is achieved, both for the main operator and for the assistant, while a particularly favorable light yield is guaranteed, as mentioned above. It is also possible to provide more than four, e.g. six or eight magnification channels, and in particular an odd number of channels, in the zoom system.

Advantageously, the objective which is used jointly by the main observer and assistant, has an optical axis which extends substantially perpendicularly, the optical axis of the zoom system extending substantially perpendicularly thereto, i.e. substantially horizontally. This measure enables the overall height of the microscope to be reduced by comparison with conventional stereomicroscopes having main observation and assistant's optical paths.

Conveniently, two magnification channels of the zoom system, particularly the main observation magnification channels extend horizontally at the same level, while two further magnification channels run parallel thereto, i.e. also horizontally, at a vertical spacing from one another. It is possible in particular for the vertically spaced magnification channels to extend above or below the center point of the connecting line between the magnification channels at the same height, i.e. horizontally spaced. This provides a particularly tight packing of the four magnification channels, which makes it possible to achieve a particularly low overall height for the stereomicroscope according to the invention.

According to a particularly preferred embodiment of the stereomicroscope according to the invention, it has a deflector element for deflecting only some or part of the beam acting upon it. This makes it possible, for example, to deflect two beams which are to be fed to the assistant's eyepiece or tube while allowing the two beams which are to be fed to the main operator's eyepiece to pass without being deflected. In all, this results in the provision of two different or differently oriented observation axes in a simple manner which is economical with light.

Expediently, the stereomicroscope according to the invention comprises deflector elements downstream of the zoom system, by means of which the beams extending horizontally through the zoom system can be deflected substantially through 180° into a horizontal direction which is opposite to the direction of passing through the zoom system. This first of all allows the horizontal size of the stereomicroscope according to the invention to be suitably dimensioned without having to tolerate an undesirably great vertical height.

According to a particularly preferred embodiment of the stereomicroscope according to the invention, it comprises at least one optical add-on component, particularly an SDI element (stereoscopic diagonal inverter), a laser shutter, an optical splitter and/or a filter, with a horizontally or vertically extending optical axis. Such components can easily be integrated in the horizontal optical paths of the stereomicroscope according to the invention without increasing the vertical height of the microscope. In conventional stereomicroscopes it was often impossible, or only possible at considerable expense, to incorporate optical components of this kind in the optical path on account of ergonomic and optical restrictions. The installation of SDI elements, so-called "pupil exchangers", in particular, was found to increase the vertical height considerably while negatively affecting the optical quality in conventional, substantially vertical optical paths. An SDI element serves to exchange the right and left stereo channels, i.e. the left channel becomes the right channel, and the right channel becomes the left channel.

It should be pointed out that within the scope of the invention mirrors, prisms, totally reflective prisms and mirrored prisms may be used as deflector elements, in particular. It should also be pointed out that the optical add on components should conveniently be used in the region of the equipment pupils so as to avoid, as far as possible, any vignetting which may occur.

Finally, we should point out that by forming a horizontal zoom system in the manner according to the invention, considerably higher zoom values can be achieved than is practicable with conventional ophthalmological stereo assistant microscopes. In conventional microscopes in which the zoom system is mounted substantially vertically, larger zoom values lead to an unacceptable overall height.

BRIEF DESCRIPTION OF THE SEVERAL VIEWS OF THE DRAWINGS

The invention will now be described more fully with reference to a preferred embodiment, referring to the accompanying drawings, wherein.

DETAILED DESCRIPTION OF THE INVENTION

Figure 1:
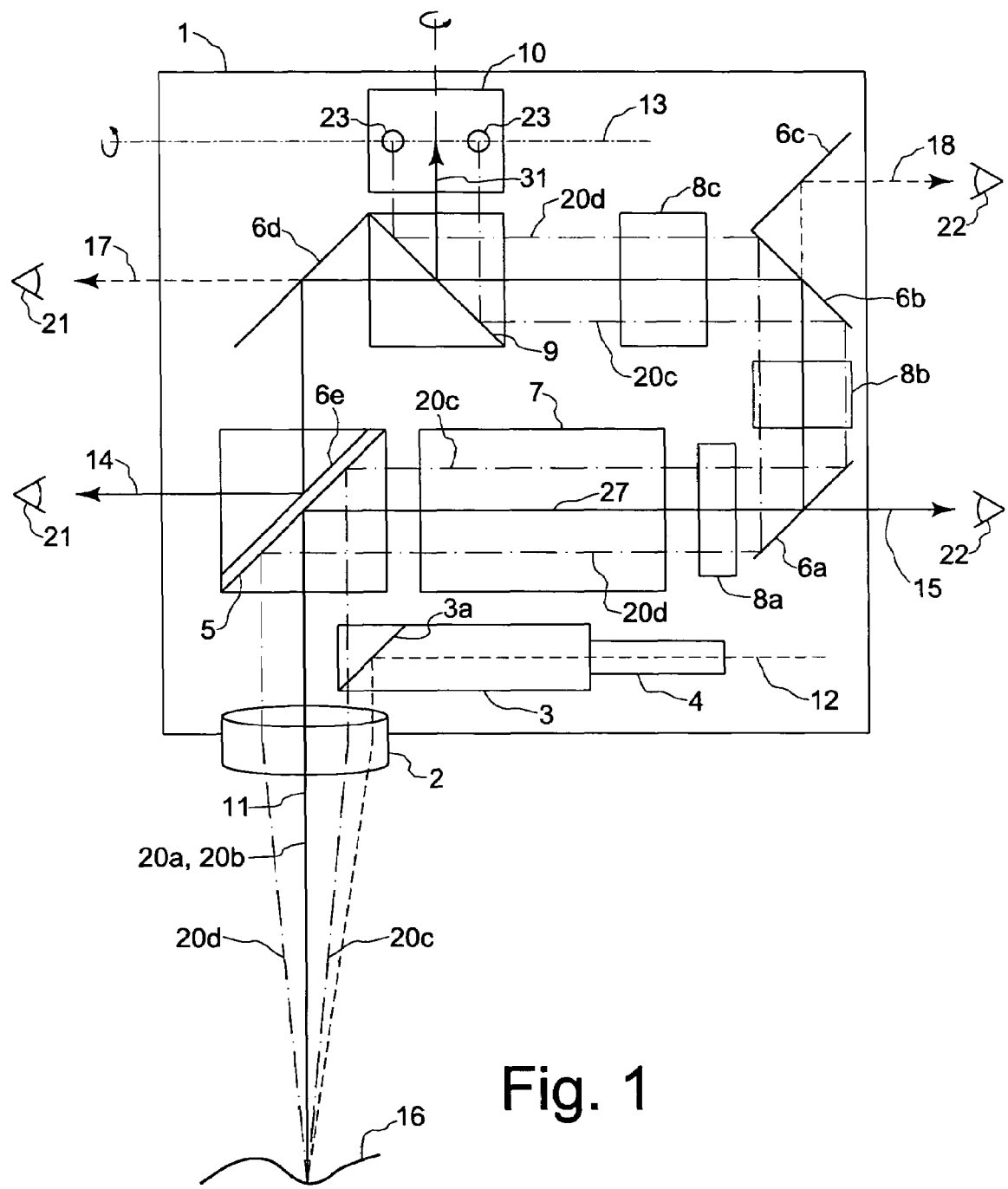
FIG. 1 is a diagrammatic side view of the overall structure of a preferred embodiment of the stereomicroscope according to the invention.

FIG. 1 diagrammatically shows a microscope body of a preferred embodiment of the stereomicroscope according to the invention, generally designated 1. In order to define the directional data used in the description let it be assumed that the left hand edge in FIG. 1 is the front and the right hand edge is the back of the microscope. The side facing the observer will be referred to as the right hand side and the side furthest from the observer will be referred to as the left hand side of the microscope. An object 16 is to be viewed using the stereomicroscope shown. The stereomicroscope shown is an ophthalmological microscope, in particular.

The stereomicroscope comprises as its essential optical components a main objective 2, a zoom system 7 and an eyepiece system (not shown).

Between the main objective 2 and the zoom system 7 is provided a first deflector element 5. Behind the zoom system 7 are additional deflector elements 6a, 6b, 6c, 6d, 6e, 9, 10 and optical add on components 8, 8a, the functions of which will be described hereinafter.

Reference numeral 3 denotes an illuminating device which directs light provided by a fiber cable 4 via a deflector element 3a on to the object 16 which is to be observed. The main axis of the illuminating device 3 is designated 12.

Figure 2:
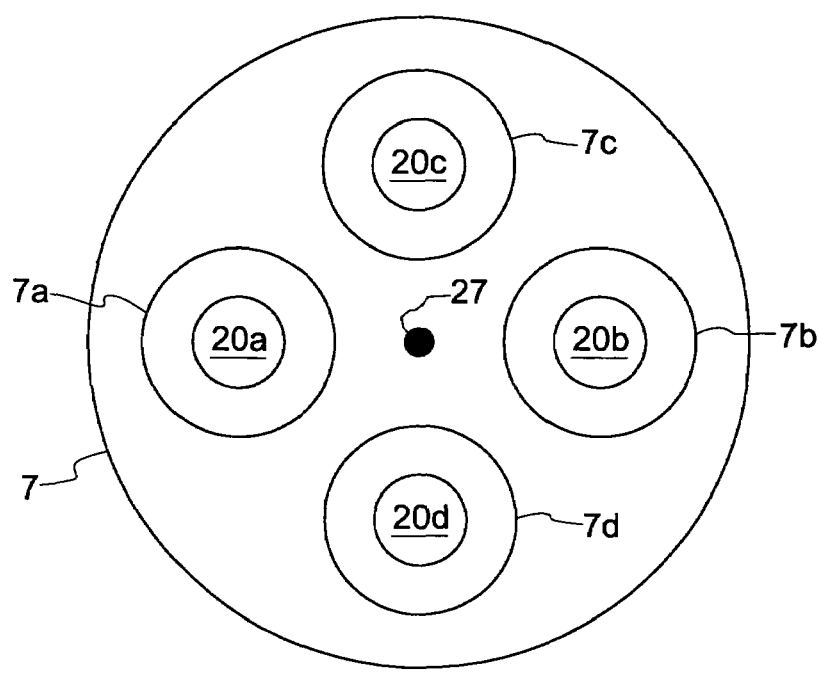
FIG. 2 is a cross sectional view of a preferred embodiment of a zoom system on pancratic lens which may be used according to the invention.

As can be seen from FIG. 2, the zoom system 7 has two main observation channels 7a, 7b and two assistant observation channels 7c, 7d.

The main objective 2 has two main observation beams 20a, 20b and two assistant observation beams 20c, 20d passing through it in a substantially vertical direction, these beams, after being suitably deflected (at right angles) by the deflector element 5, entering the substantially horizontally extending main and assistant observation channels 7a, 7b, 7c, 7d of the zoom system. FIG. 2 shows the beam cross sections of the beams 20 to 20d accordingly.

The two main observation beams 20a, 20b are located one behind the other in the direction of viewing in FIG. 1, so that only one of these beams can be shown. As is also clear from FIGS. 1 and 2, the four main or assistant observation beams 20a to 20d are symmetrically distributed about the optical axis 11 of the main objective 2. Advantageously, the common axis of the observation beams 20a to 20d may also pass decentrally through the main objective, i.e. it may be parallel to the axis 11. The same is true of the central axis 27 of the zoom system 7 shown in FIG. 2, about which the observation channels 7a to 7d and the beams 20a to 20d passing through them are symmetrically arranged.

It will be seen that the main observation channels 7a, 7b extend in a horizontal plane, i.e. level with the central axis 27, whereas the assistant observation channels 7c, 7d extend above and below the central axis 27, vertically spaced from one another. The arrangement shown achieves very tight packing of the observation channels 7a to 7d by means of which the construction of the stereomicroscope according to the invention can be made compact overall.

After leaving the zoom system 7 the observation beams 20a to 20d are further deflected at the additional deflector element 6a.

This deflector element 6a deflects the observation beams 20a to 20d substantially back into he vertical direction. They then meet another deflector element 6b by means of which they are again deflected into the horizontal direction, as a result of which they act upon the deflector element 9, the function of which will be described below, optionally after passing through the additional optical components generally designated 8 which are optionally provided. It should be mentioned at this point that the deflector element 6a and/or deflector element 6b may be provided in the form of optical beam splitters, by means of which the observation axes designated 15 and 18 can be defined. In order to define the observation axis 18 another deflector element 6c is used, as shown in FIG. 1. The observation axes 15, 18 are expediently used in the course of a 180° observation by the assistant, the vertical spacing between the object 16 and observation axis 18 being greater than that between the object 16 and the observation axis 15.

However, it should be pointed out that these observation axes 15, 18 are only optionally implemented. The essential observation axes for the main observer and assistant observer are designated 14 and 23 according to the embodiment shown, as will be explained in more detail.

The binocular tubes and eyepieces needed for observation by the main observer 21 and assistant observer 22 have not been shown in FIG. 1 on axes 14, 15, 17, 18 and 23, in the interests of clarity.

The beams 20a to 20d deflected into the horizontal by means of the deflector elements 6b strike the deflector element 9, as already mentioned. The deflector element 9 is constructed so as to deflect only the beams 20c, 20d, while the beams 20a, 20b pass through the deflector element 9 without deflection and strike the next deflector element 6d.

Figure 3:
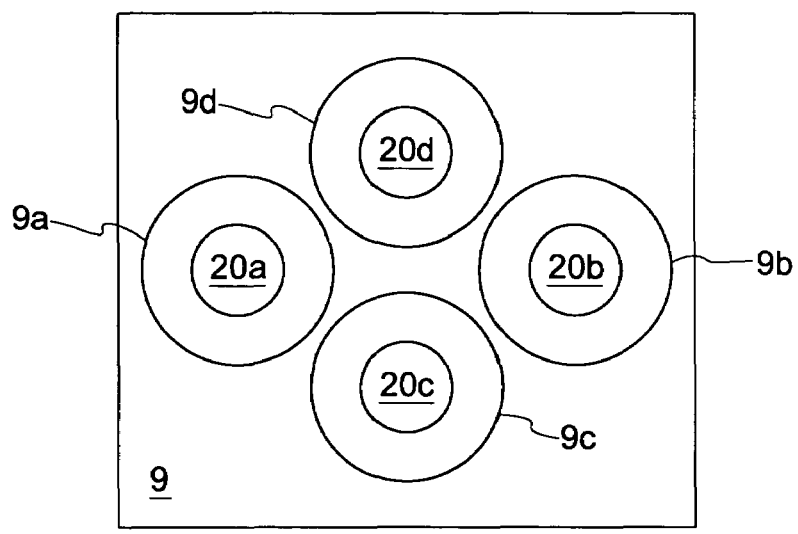
FIG. 3 is a plan view of a preferred embodiment of a deflector element which may be used according to the invention for partially deflecting beams.

FIG. 3 shows the deflector element 9 in the direction of impact of the beams 20a to 20d. The cross sections of the beams 20a to 20d strike corresponding areas 9a to 9d of the deflector element. In order to deflect the observation beams 20c, 20d the areas 9c, 9d of the deflector element 9 are made reflective, whereas the areas 9a, 9b are transparent, so that the observation beams 20a, 20b can pass through them without any obstruction.

By using a deflector element 9 of this kind it is easily possible to achieve spacial separation of the main observations beams 20a, 20b from the assistant observation beams 20c, 20d with no loss of light intensity, which is unavoidable for example when using semi-transparent beam splitters.

As already mentioned, the main observation beams 20a, 20b after passing through the regions 9a, 9b of the deflector element 9 strike the additional deflector element 6d by means of which the horizontally extending observation beams 20a, 20d are deflected vertically downwards, the observation beams 20a, 20b then striking another deflector element 6e which causes another deflection into the horizontal direction, thereby defining the observation axis 14 mentioned above. The observation axis 14 is characterised by a particularly small vertical spacing from the object 16 which is to be observed.

If, on the other hand, a greater vertical spacing from the object 16 is desired, e.g. for ergonomic reasons, the deflector element 6d can be omitted, thus resulting in the observation axis designated 17. Alternatively, it is possible to make the deflector element 6d semi-transparent so that the two observation positions 14 and 17 mentioned can both be achieved at the same time.

Thus, for example, the main observer is able to look through a binocular tube (not shown) into the microscope either at the level of the observation axis 14 or at the level of the observation axis 17, by a suitable construction of the deflector element 6d. In practice this will depend on the ergonomically necessary or desirable height of the microscope. The same is true of the other observation axes 15, 18 mentioned above which are variants of a fixed 180° viewing by the assistant.

By a particular design of the deflector element 6c, 6d and 6e the axes 14, 17 and 18 may also differ from the right angle to the axis 11 shown in FIG. 1 or may even be variable if the deflector elements are capable of being tilted.

Because of the number of deflections care must be taken to ensure that the embodiment of the deflector elements 6c, 6d, 6e and 10 is such that there is always an upright image, on the right side, at axes 14, 17, 18 and 23. This is achieved for example with roof edges and/or pentaprisms.

After deflection in the regions 7c, 7d the observation beams 20c, 20d strike another deflector element designated 10. This deflector element 10 may consist in all of a number of deflector components which are linked by a so called 2α gear so that the observation beams 20c, 20d can be deflected out of the plane of the drawing shown in FIG. 1 about a rotation axis 13. The A 2d gear is a gear or transmission, with which an input-side pivoting movement about an angle α causes a pivoting movement of 2 α on an output-side. This situation will now be explained more fully with reference to FIG. 4.

Figure 4:
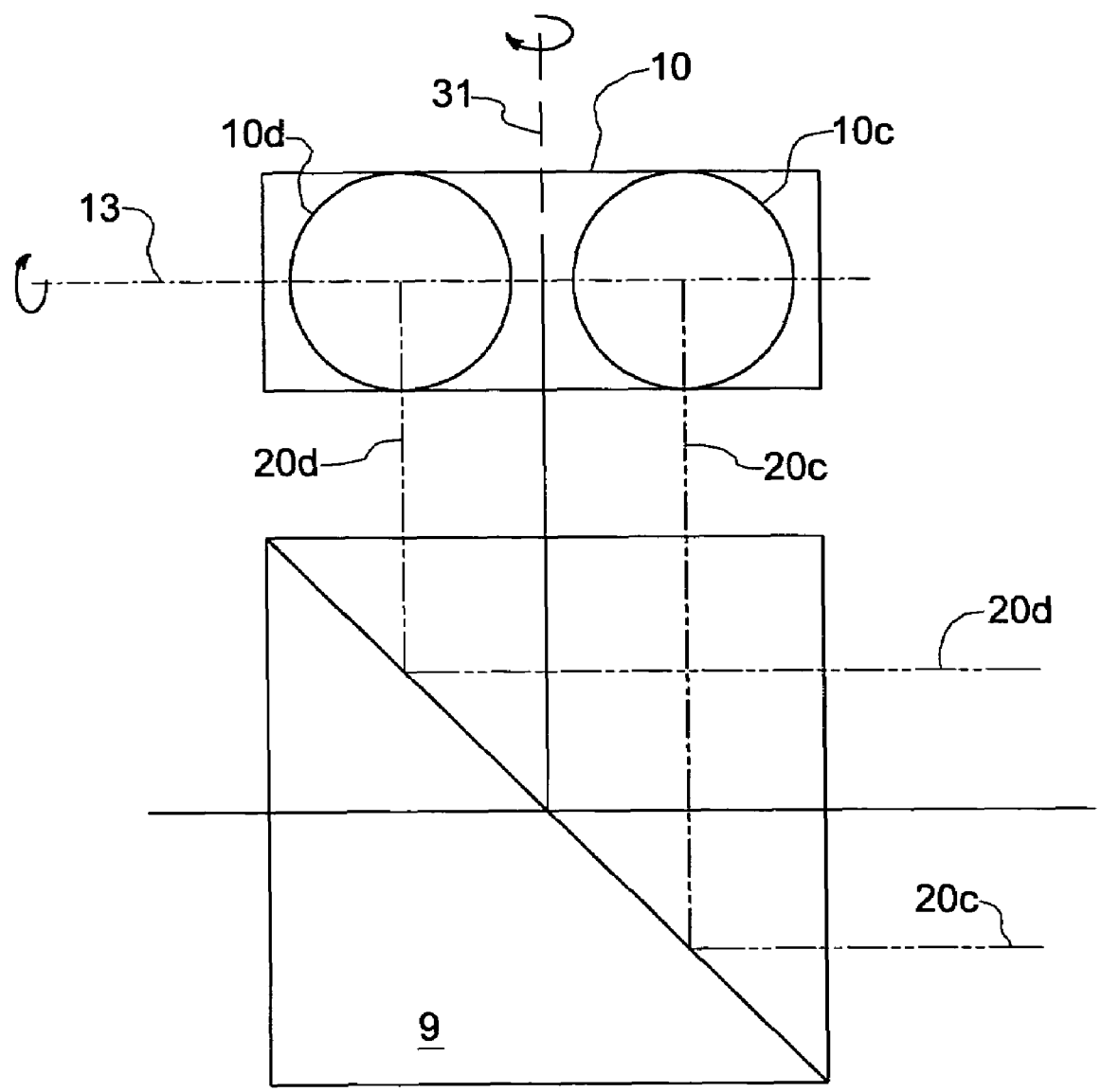
FIG. 4 is an enlarged view of deflector elements which may be used in the stereo microscope according to the invention for separating the main and assistant's optical path.

FIG. 4 shows the observation beams 20c, 20d deflected on the deflector element 9 into the vertical direction. In the view shown in FIG. 4 the deflector element 10 comprises two deflector regions 10c, 10d by means of which the observation beams 20c, 20d can be deflected, for example; perpendicularly out of the plane of the drawing. Pivoting the deflector element 10 about the axis 13 makes it possible to move the assistant's view from the right hand to the left hand side of the microscope about the axis 13, i.e. over the upper surface of the microscope body 1. Hitherto, the assistant's view has only been rotated about the perpendicular axis 11 or 31 about the front surface of a microscope, as a result of which obstacles might crop up, for example, caused by other optical components provided in the region of the front surface of the microscope, resulting in the need for laborious adaptation to change the viewing position for the assistant.

Instead of the deflector element 10 shown it is also possible to have a mechanical interface which accommodates the so called 180° binocular tube which in principle allows the same deflection but has an overall length which can be corrected. It is to be noted that a 180° binocular tube is a stereotype viewing with eyepieces (oculars), which is always situated above (i.e. downstream) of the zoom system. The 180° binocular tube especially serves to convert parallel beams into converging beams. It should also be possible to use a separate zoom system and optionally other deflector elements, reversal systems for image erecting, beam inverters such as SDI-systems, filter inserts and/or optical imaging equipment for ergonomically deflecting the beam in the assistant's viewer. In the embodiment of the stereomicroscope according to the invention shown it is also possible to make the deflector element 10 rotatable about the axis 31, as known from the prior art, additionally or instead of the rotation about the axis 13 described above.

It should be pointed out that the deflection described for all the deflector elements shown is chosen to be 90°, purely by way of example. Depending on the amount of space available, larger or smaller deflection angles may be desirable or necessary, the deflection being carried out in every direction in space, so that the deflections may also be skewed.

The illuminating device 3,4 mentioned above is, as shown, advantageously disposed between the main objective 2 and the deflector element 5. Alternatively, this illumination may also be provided between the deflector element 5 and the zoom system 7 or in the region between the deflector element 5 and the deflector elements 6d, 9. In this case the deflector element is then partially transparent.

If desired it should also be possible to mount so called "pull out extensions" which make the spacing of the tubes from the microscope housing 1 variable, in front of the binocular tubes (not shown) for stereoscopic viewing by the main operator 21 and assistant 22 along the observation axes 14, 15, 17, 18 and 23. The tubes should also advantageously be capable of being rotatably fixed about this axis by means of a so called "rotatable dovetail". Such rotational dovetails provide the mechanical connection between the microscope and the respective binocular tubes which can be provided at axes 14, 15, 17, 18 i.e. the rotational dovetails or rotatable dovetails guides are pivotable about axes 14, 15, 17, 18.

It is also possible to insert other optical components in the optical paths described, which are designated 8a, b, c in FIG. 1. The add on components 8 may be used as desired at the points designated. Such components may for example allow intermediate imaging or a displacement of the pupil. These elements may also be shutters which interrupt or open up the flow of light as desired in different possible combinations in the different observation channels. Mechanical shutters or displays with electrochromic actuateable layers may be used. By lining up components along a horizontal axis in this way it is possible to effectively avoid non-ergonomic excessive overall height as is found with conventional ophthalmological stereo-assistant microscopes.

The zoom system 7 is conveniently characterised in that it allows magnification in the range from 5–10, each observation channel preferably consisting of at least three optical groups, of which at least one group is fixed. In addition, the observation channels should be aligned parallel to one another. The main objective is shown in the view in FIG. 1 as being symmetrical to its axis 11. The main objective may also be arrange decentrally with respect thereto. The optical correction of this objective is advantageously achromatic or apochromatic, taking special account of the secondary spectrum.

The beam cross sections (pupils) shown in FIGS. 2 and 3 may have different diameters and may be in any desired position relative to one another. The spacings between the center points of the beams 20a, 20b and 20c, 20d are typically referred to as stereo base and have a value between 20 mm and 30 mm. If obstacles occur, for example the deflector element 9, which is supposed to let some of the observation beam pass by unimpeded, further deflector elements in the beam axis may give rise to the need for larger spacings between the individual observation beams, which can be recombined and reduced after "going round" the obstacle.

It is also in principle possible to attach documentation devices, e.g. cameras, to the observation axis on which binocular tubes are typically provided, wherein it is also possible to use other optical splitters.

With reference to FIG. 1, in particular, it is clear that the beams 20a, 20b (on the vertical path) between the object 16 and the first deflector element 5 have to cover the same distance as they act on the deflector element 5 at the same height. By contrast the distance to be covered accordingly by the beams 20c, 20d between the object and the first deflector element is different because of the different vertical heights of the points of impact on the deflector element 5, so that further along the optical path through the microscope a corresponding compensation has to be provided. According to the invention this compensation is provided by means of a corresponding number or alignment of additional deflector elements, in the present instance 6a, 6b and 6c, so that when he observation axis 23 is reached the distance has been equalised accordingly.

LIST OF REFERENCE NUMERALS

1 Body of microscope
2 Main objective
3 Illuminating device
3a Deflector element
4 Fiber cable
5 Deflector element
6a–6e Deflector elements
7 Zoom system
7a; 7b Main observation channels
7c, 7d Assistant observation channels
8a, b, c Additional components such as filters, laser shutters, SDI, optical splitters, data projectors
9 Deflector element for assistant optical path
9a–9d Areas of passage or deflection of the deflector element 9
10 Deflector element for pivoting the assistant optical path
10c, 10d Deflector areas of the deflector element 10
11 Axis of symmetry of the main objective
12 Axis of the illuminating device
13 Rotation axis of deflector element 10
14 Observation axis
15 Observation axis
16 Object
17 Observation axis
18 Observation axis
20a, 20b Main observation beam
20c, 20d Assistant observation beam
21 Main observer
22 Assistant observer
23 Assistant observation axis
27 Central axis of zoom system
31 Axis

What is claimed is:

1. A stereomicroscope comprising:
   an objective having an optical axis extending substantially vertically;
   a zoom system downstream of the objective; and
   a deflector element between the objective and the zoom system for deflecting observation beams emerging from the objective into corresponding magnification or observation channels of the zoom system;

wherein the zoom system includes at least three substantially horizontally extending magnification or observation channels that pass entirely through the zoom system while remaining spatially separated from one another.

2. The stereomicroscope according to claim 1, wherein the zoom system has four magnification or observation channels.

3. The stereomicroscope according to claim 1, wherein the zoom system has four magnification or observation channels, and two of the magnification or observation channels of the zoom system extend horizontally at the same height and two of the magnification channels of the zoom system extend horizontally at a vertical spacing from one another.

4. The stereomicroscope according to claim 1, further comprising another deflector element downstream of the zoom system for deflecting fewer than all of the observation beams received by the another deflector element.

5. The stereomicroscope according claim 1, further comprising a deflector element which is pivotable about a horizontal axis.

6. The stereomicroscope according claim 1, further comprising a deflector element which is pivotable about a vertical axis.

7. A stereomicroscope comprising:
an objective;
a zoom system downstream of the objective;
a deflector element between the objective and the zoom system for deflecting observation beams emerging from the objective into corresponding magnification or observation channels of the zoom system; and
deflector elements downstream of the zoom system for redirecting observation beams along a horizontal direction that is substantially opposite to a horizontal direction along which the observation beams travel through the zoom system;
wherein the zoom system includes at least three substantially horizontally extending magnification or observation channels that pass entirely through the zoom system while remaining spatially separated from one another.

8. The stereomicroscope according to claim 1, further comprising at least one optical add-on component having a horizontally or vertically extending optical axis.

9. The stereomicroscope according to claim 8, wherein the at least one optical add-on component includes a stereoscopic diagonal inverter element.

10. The stereomicroscope according to claim 8, wherein the at least one optical add-on component includes a laser shutter.

11. The stereomicroscope according to claim 8, wherein the at least one optical add-on component includes an optical splitter.

12. The stereomicroscope according to claim 8, wherein the at least one optical add-on component includes a data projector.

13. The stereomicroscope according to claim 8, wherein the at least one optical add-on component includes a filter.

* * * * *